Feb. 3, 1959 W. M. CARRAWAY 2,871,607
ILLUMINATED FISHING INDICATOR
Filed June 6, 1958 2 Sheets-Sheet 1
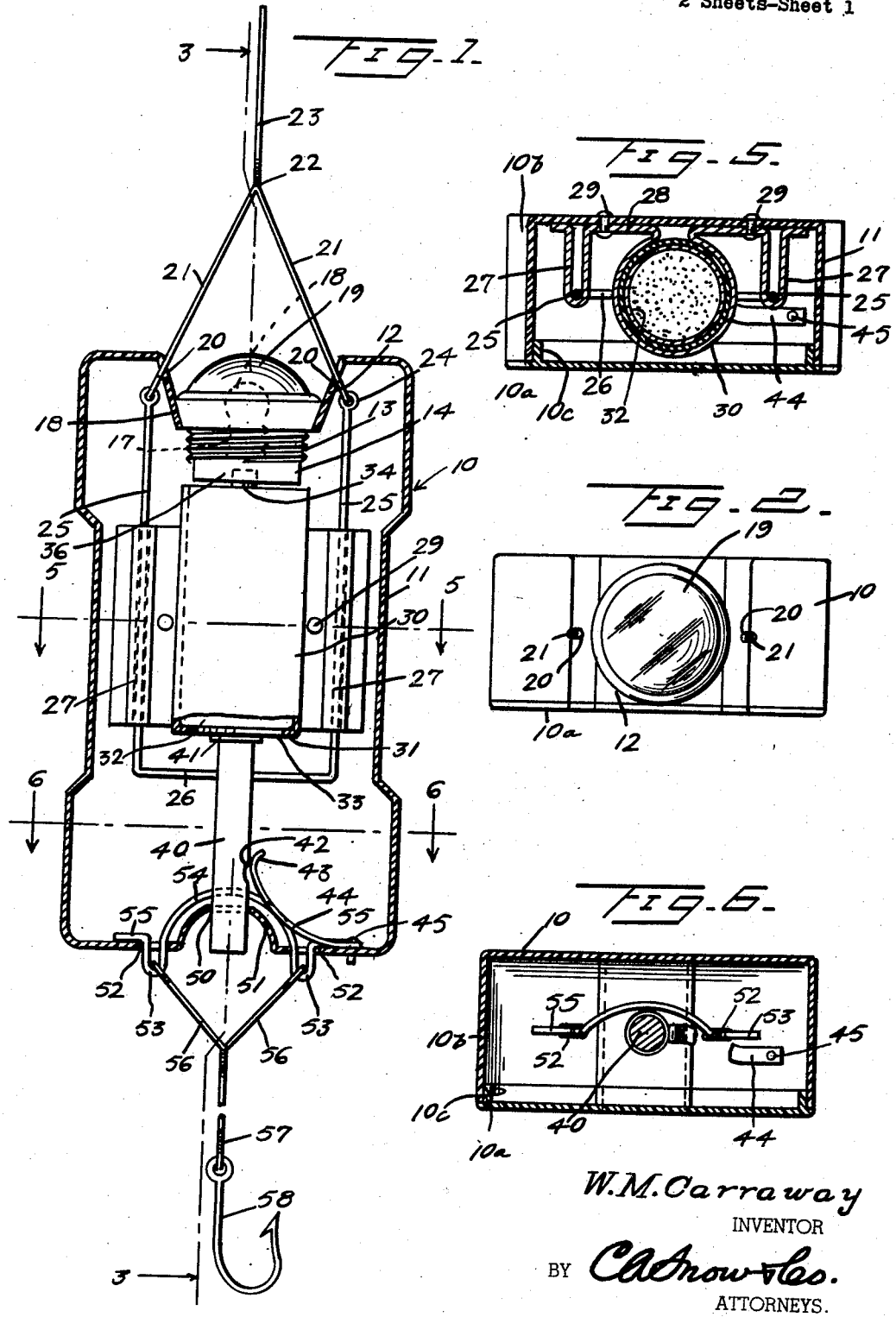
W. M. Carraway
INVENTOR

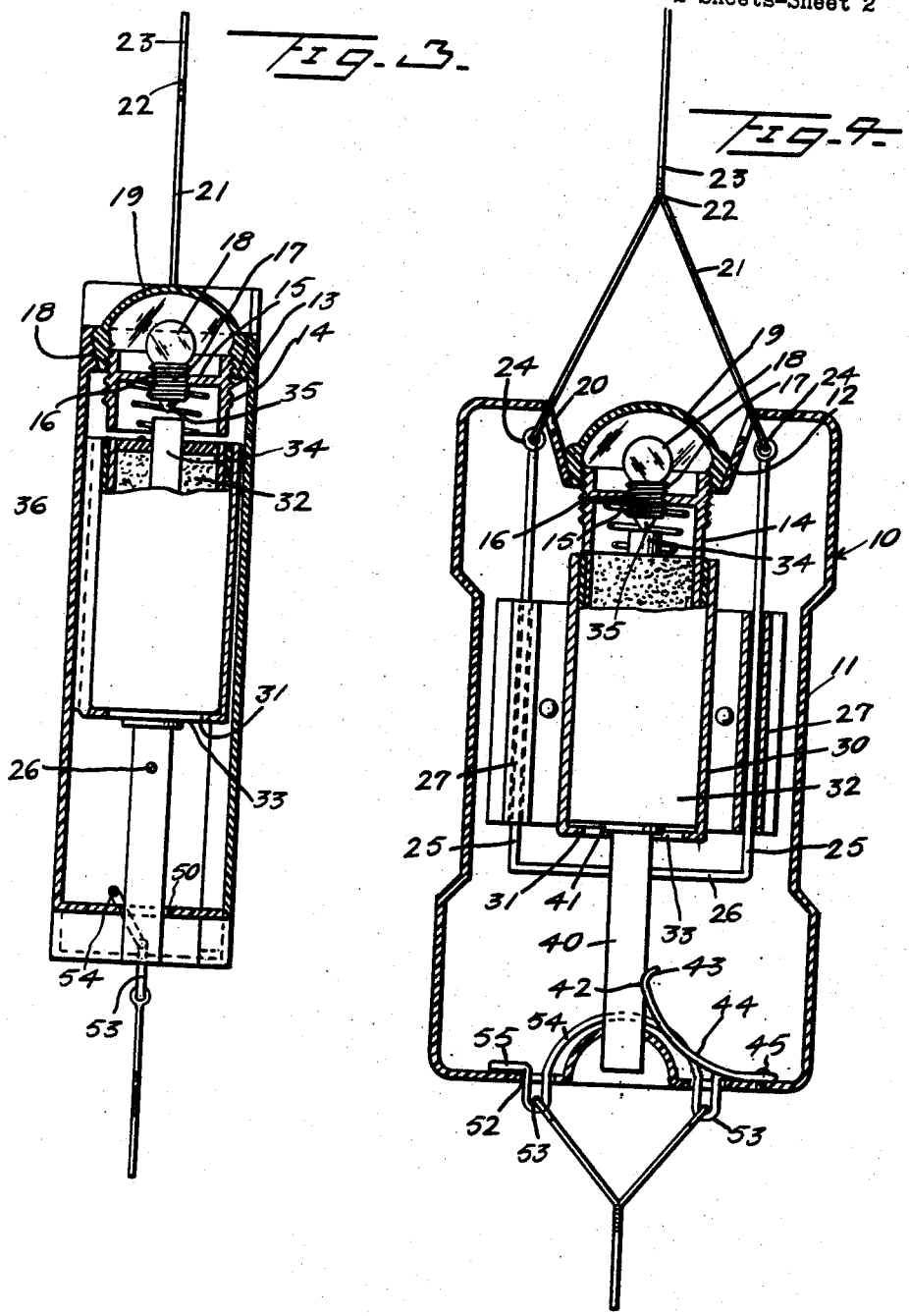

United States Patent Office 2,871,607
Patented Feb. 3, 1959

2,871,607

ILLUMINATED FISHING INDICATOR

William M. Carraway, Little Rock, Ark.

Application June 6, 1958, Serial No. 740,221

4 Claims. (Cl. 43—17)

This invention relates to an illuminated fishing indicator, and more particularly to an indicator provided with a light bulb which is adapted to be connected to a fishing line and which upon a strike on the line will illuminate a bulb for the purpose of calling attention of the fisherman to the strike.

An additional object of the invention is the provision of such a device which is particularly adapted for set fishing, which will after the initial strike, maintain the device in illuminated condition, until reset manually.

An additional object of the invention is the provision of such a device which is provided with recessed end portions containing a bulb, the lens therefor and the actuating plunger, whereby the device may be readily and simply packed.

An additional object of the invention is the provision of such a device having a casing which is recessed at its edges for the purpose of providing a space wherein a line may be coiled without adding unnecessary bulk to the device.

Still another object of the invention is the provision of such a device which is sturdy and durable in construction, reliable and efficient in operation, and relatively simple and inexpensive to manufacture, assemble and utilize.

Still other objects reside in the combinations of elements, arrangements of parts, and features of construction, all as will be more fully pointed out hereinafter, and disclosed in the accompanying drawing wherein there is shown a preferred embodiment of this inventive concept.

In the drawings:

Figure 1 is a vertical longitudinal sectional view taken through one form of the device, showing the parts in inactive or unilluminated condition.

Figure 2 is a top plan view of the construction of Figure 1, parts thereof being broken away.

Figure 3 is a sectional view taken substantially along the line 3—3 of Figure 1 as viewed in the direction indicated by the arrows, parts thereof being broken away.

Figure 4 is a sectional view similar to Figure 3, but having additional parts broken away, and showing the parts in operative or illuminated condition.

Figure 5 is a sectional view taken substantially along the line 5—5 of Figure 1 as viewed in the direction indicated by the arrows.

Figure 6 is a sectional view taken substantially along the line 6—6 of Figure 1 as viewed in the direction indicated by the arrows.

Similar reference characters refer to similar parts throughout the several views of the drawings.

Having reference now to the drawings in detail, there is generally indicated at 10 a casing, which is substantially rectangular in cross section, and which has a recess or depressed portion 11 in the center thereof, for the accommodation of a line adapted to be wound thereabout. The casing 10 is provided with an inverted frusto conical flange 12 centrally located in its top, which contains an interior metal socket 13 at its lower extremity. The socket 13 is adapted for the reception of an exteriorly threaded plug member 14, provided with a central flange 15, which is threaded as at 16 to receive the threaded portion 17 of a conventional flashlight bulb 18. The socket member 14 also has threaded thereon the internally threaded rim 18 of a plastic lens 19, which is adapted securely to seat within the counter sunk frusto conical portion 12.

Openings 20 are provided on opposite sides of the frusto conical member 12, through which are adapted to be passed lines 21, which are secured together as at 22 to merge into a single line 23, the latter forming a supporting line, and adapted to be secured in any suitable fixed support. The lines 23 engage eyes 24 at the ends of legs 25 of a U-shaped member having a bight 26. The legs 25 are supported for longitudinal movement in elongated guides 27, which are formed in a plate 28, which is suitably secured to the casing as by means of rivets 29, the plate also being formed with a circular battery holder 30, having inwardly turned flanges 31 at its lower end which provide supports for a battery 32 contained therein, the flanges 31 surrounding an opening 33 in the bottom of the battery support. The terminal 34 of the battery is adapted to engage the terminal 35 of the bulb 18 when moved in a manner to be more fully described hereinafter. A spring 36 positioned between the flange 15 and the upper end of the battery 32 serves normally to bias the terminal 34 away from the terminal 34 away from the terminal 35.

The bight 26 of the U-shaped member is connected to a centrally positioned rod or plunger 40, which has a head 41, which is adapted to extend through the opening 33, and engage, under conditions to be more fully described hereinafter the bottom of the battery 32.

The plunger 40 has a recess or detent 42 in the side thereof which is adapted to be engaged by the arcuate end 43 of the spring lever 44, which is secured to the bottom of the casing by means of a rivet 45.

The rod 40 extends through an opening 50 in a counter sunk depression 51 in the lower end of the casing 10. Apertures 52 are provided on opposite sides of the counter sink, and accommodate U-shaped bent portions 53 of a reversely U-shaped wire 54, which is provided with extending end portions 55.

The arrangement is such that the arcuate portion 54 extends rearwardly of the rod or plunger 40, in order that the latter may be moved freely independently of the wire 54. The separate ends 56 of a line 57 which terminates in a fish hook 58 are engaged in the U-shaped members 53.

As best shown in Figures 5 and 6, the casing 10 is comprised of two separable parts, including a front plate 10a in a rear receptacle 10b, to which the battery holder 30 and its associated plate 28 are attached, the cover 10a being provided with a flange 10c about its periphery, in order that the two separate parts may be clampingly engaged, and yet readily separated when it is desired to have access to the interior.

From the foregoing the use and operation of the device should now be readily understandable. The lines 57 and 23 may be wound about the container in the recess portion 11 thereof during shipping or packing, and suitably unwound, and the line 23 secured to any suitable support for suspending the casing 10 and its associated parts. The hook 58 may then be baited, it being understood that the line 57 may be of any desired length, and may include, if desired, a suitable spring biased reel, or other means for accommodating a relatively long line.

When the device is inoperative, and the hook floating freely, as by means of an associated conventional float or the like, the parts are in the position shown in Figure 1, with the plunger 40 retracted below the lower end of the battery 32, and the contact 34 out of engagement with the contact 35. A strike on the hook 58 however will through the U-shaped members 53 pull the casing downwardly, while the lines 21 and their association with the eyes 24 of the legs 25 of the U-shaped member will remain substantially stationary. Such pull will obviously move the end 41 of the plunger 40 into contact with the lower end of the battery 32, through the opening 33, which will cause the contacts 34 and 35 to be engaged to illuminate the bulb 18.

Simultaneously with this operation the end 43 of the spring member 44 will engage in the detent 42, holding the parts in contacting position, until such time as attention is drawn to the illuminated bulb, at which time the operator may remove the fish or rebait the hook as circumstances may dictate, and simultaneously disengage the parts so that contacts 34 and 35 are separated, and the device reset for use.

From the foregoing it will now be seen that there is herein provided an improved fishing light or indicator, which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

What is claimed is:

1. In a device of the character described, a casing having a bottom and a top with a countersunk opening therein, a lamp socket assembly including a lens secured in said opening, a lamp bulb including a contact in said socket, a plate secured interiorly of said housing, a battery holder carried by said plate, a battery having a contact slidably movable in said holder, slide guides carried by said plate, a U-shaped slide having its legs movable in said guide, a plunger carried by the bight of said U-shaped slide, said battery holder having an opening in the bottom thereof through which said plunger extends to contact the bottom of said battery, a supporting line secured to the legs of said U-shaped slide, said top having openings through which said supporting line extends and a fishing line secured to the bottom of said casing whereby a pull on said fishing line will move said casing relative to said slide and plunger to cause said plunger to move said battery to engage its contact with the contact of said lamp to illuminate said lamp.

2. In a device of the character described, a casing having a bottom and a top with a counter sunk opening therein, a lamp socket assembly including a lens secured in said opening, a lamp bulb including a contact in said socket, a plate secured interiorly of said housing, a battery holder carried by said plate, a battery having a contact slidably movable in said holder, slide guides carried by said plate, a U-shaped slide having its legs movable in said guide, a plunger carried by the bight of said U-shaped slide, said battery holder having an opening in the bottom thereof through which said plunger extends to contact the bottom of said battery, a supporting line secured to the legs of said U-shaped slide, said top having openings through which said supporting line extends, a fishing line secured to the bottom of said casing whereby a pull on said fishing line will move said casing relative to said slide and plunger to cause said plunger to move said battery to engage its contact with the contact of said lamp to illuminate said lamp, and means for securing said plunger and hence said battery in light illuminating position.

3. In a device of the character described, a casing having a bottom and a top with a counter sunk opening therein, a lamp socket assembly including a lens secured in said opening, a lamp bulb including a contact in said socket, a plate secured interiorly of said housing, a battery holder carried by said plate, a battery having a contact slidably movable in said holder, slide guides carried by said plate, a U-shaped slide having its legs movable in said guide, a plunger carried by the bight of said U-shaped slide, said battery holder having an opening in the bottom thereof through which said plunger extends to contact the bottom of said battery, a supporting line secured to the legs of said U-shaped slide, said top having openings through which said supporting line extends, a fishing line secured to the bottom of said casing whereby a pull on said fishing line will move said casing relative to said slide and plunger to cause said plunger to move said battery to engage its contact with the contact of said lamp to illuminate said lamp, and means for securing said plunger and hence said battery in light illuminating position, said means including a detent formed in said plunger and a spring finger secured to the bottom of said casing engageable in said detent.

4. In a device of the character described, a casing having a bottom and a top with a counter sunk opening therein, a lamp socket assembly including a lens secured in said opening, a lamp bulb including a contact in said socket, a plate secured interiorly of said housing, a battery holder carried by said plate, a battery having a contact slidably movable in said holder, slide guides carried by said plate, a U-shaped slide having its legs movable in said guide, a plunger carried by the bight of said U-shaped slide, said battery holder having an opening in the bottom thereof through which said plunger opening in the bottom thereof through which said plunger extends to contact the bottom of said battery, a supporting line secured to the legs of said U-shaped slide, said top having openings through which said supporting line extends, a fishing line secured to the bottom of said casing whereby a pull on said fishing line will move said casing relative to said slide and plunger to cause said plunger to move said battery to engage its contact with the contact of said lamp to illuminate said lamp, and means for securing said plunger and hence said battery in light illuminating position, said means including a detent formed in said plunger and a spring finger secured to the bottom of said casing engageable in said detent, said casing having a reduced portion about which said lines may be wound without increasing the bulk of said device.

References Cited in the file of this patent

UNITED STATES PATENTS

| | | |
|---|---|---|
| 989,145 | Hatchett | Apr. 11, 1911 |
| 1,518,424 | Haserodt | Dec. 9, 1924 |
| 1,986,683 | Schmeltzer | Jan. 1, 1935 |
| 2,431,420 | Pope | Nov. 25, 1947 |
| 2,722,763 | Miner et al. | Nov. 8, 1955 |